United States Patent [19]

Thomas

[11] 4,229,761
[45] Oct. 21, 1980

[54] ILLUSION TRANSMITTER

[76] Inventor: Valerie L. Thomas, 7001 Kingfisher La., Lanham, Md. 20801

[21] Appl. No.: 973,886

[22] Filed: Dec. 28, 1978

Related U.S. Application Data

[63] Continuation-in-part of Ser. No. 824,516, Aug. 15, 1977, abandoned.

[51] Int. Cl.² .......................... H04N 9/54; H04N 5/74
[52] U.S. Cl. ........................................ 358/90; 358/238; 358/2; 350/3.6
[58] Field of Search ...................... 358/90, 2, 212, 240, 358/225, 231, 238; 350/361, 3.6; 280/199

[56] References Cited

U.S. PATENT DOCUMENTS

| | | | |
|---|---|---|---|
| 2,158,405 | 5/1939 | Coanda | 358/113 |
| 2,716,231 | 8/1955 | Blayney | 358/238 |

*Primary Examiner*—Robert L. Griffin
*Assistant Examiner*—Edward L. Coles
*Attorney, Agent, or Firm*—Lawrence Harbin

[57] ABSTRACT

A real time illusion transmitter for transmitting three dimensional illusions of an object comprising a first parabolic mirror for producing a real image of an illuminated object, image detection means disposed in a position to receive said real image and adapted to generate video signals for transmission by cable or electromagnetic means, a second parabolic mirror located at a remote site and having associated therewith an image projector for producing an image from signals transmitted from said first parabolic mirror; said image projector projecting an image normal to the principle axis of the parabolic mirror to produce an illusion of the image when reflected from the parabolic mirror.

1 Claim, 3 Drawing Figures

ILLUSION TRANSMITTER

CROSS-REFERENCE TO RELATED APPLICATIONS

This application is a continuation in-part of Ser. No. 824,516 filed Aug. 15, 1977, now abandoned.

BACKGROUND OF THE INVENTION

This invention is related to the art of producing and transmitting three dimensional illusions of an object located at a remote site.

Similar art for transmitting three dimensional pictures include holographic production of the image recordings using coherent light and employing front wave reconstruction techniques.

Such methods are disclosed in Patent No. 3541238 issued to Encloe. It is well known that the process of three dimensional image production by holographic means necessitates the use of coherent radiation at both the object scene. Such condition inhibits the practicalities of wide spread use of such systems due to the expense and sophisticated technologies.

Optical illusions may be produced by parabolic mirrors wherein such images produced thereby are possessed with three dimensional attributes. The optical effect may be explained by the fact that the human eyes see an object from two view points separated laterally by about six centimeters. The two views show slightly different spacal relationships between near and near distant objects and the visual process fuses these stereoscopic views to a single three dimensional impression. The same parallax view of an object may be experienced upon reflection of an object seen from a concave mirror.

In the instant invention the applicant utilizes the illusionary effect created by concave mirrors to produce three dimensional image illusions at a remote site without the expense and complications of holographic image transmissions.

SUMMARY OF THE INVENTION

It is accordingly a primary object of the invention to achieve a real time, three dimensional television system for production of three dimensional illusions of an object at a remote site.

In accordance with that objective, the invention consists of a parabolic mirror located at a transmission site and having disposed about its principal axis beyond the center of focus point an object field which is illuminated by conventional light sources. Rays of light transmitted from the illuminated object field are reflected from the surface of the parabolic mirror in such a manner as to create an image between the center of focus and the focal point of the concave mirror, the focal point being a point wherein all light rays paralled to the principal axis striking the surface of the mirror will converge. An facsimile detector is disposed between the focal point and the center of curvature in such a manner as to capture on its surface an image of the illuminated object. The image detector is adaptable for photo-detection and the production of electronic signals to be further processed and transmitted to a remote transceiver via electromagnetic or cable means.

Located at a remote site is a second concave mirror having a principle axis and respective focal and center of curvature point. An image projector is disposed beyond the focal point but within center of curvature and adaptable to produce an illuminated image after reception by a transmitter and processing by a video processor. A viewer observing an image reflected from the surface of the parabolic mirror will observe the illusionary image disposed beyond.

It should also be understood that optical principles dictate that the respective sizes of the image and objects may be varied in accordance with the relative distance between the object at the transmission station and the parabolic mirror. The reflected image from the object is always disposed beyond the focal point. The size of the reflected image will diminish as the distance between the object and the concave mirror increases, and conversely. It should also be noted that the image is inverted, and accordingly, an inverted image is produced on the imate screen at the remote site, thereby generating an upright illusion of the object.

DETAILED DESCRIPTION OF DRAWINGS

Figure 1B:
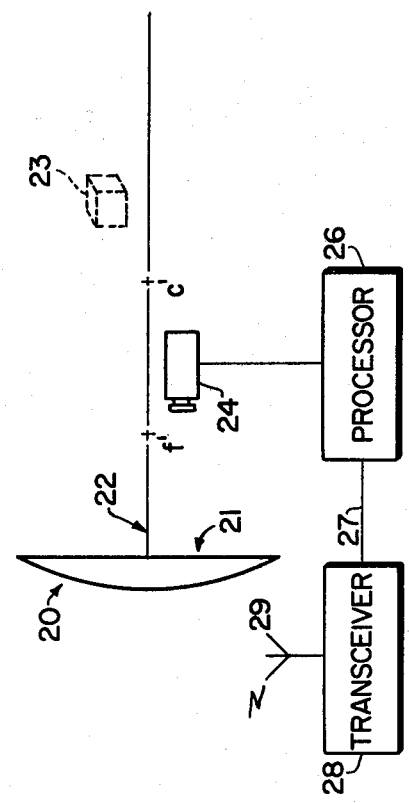
Figure 1A:
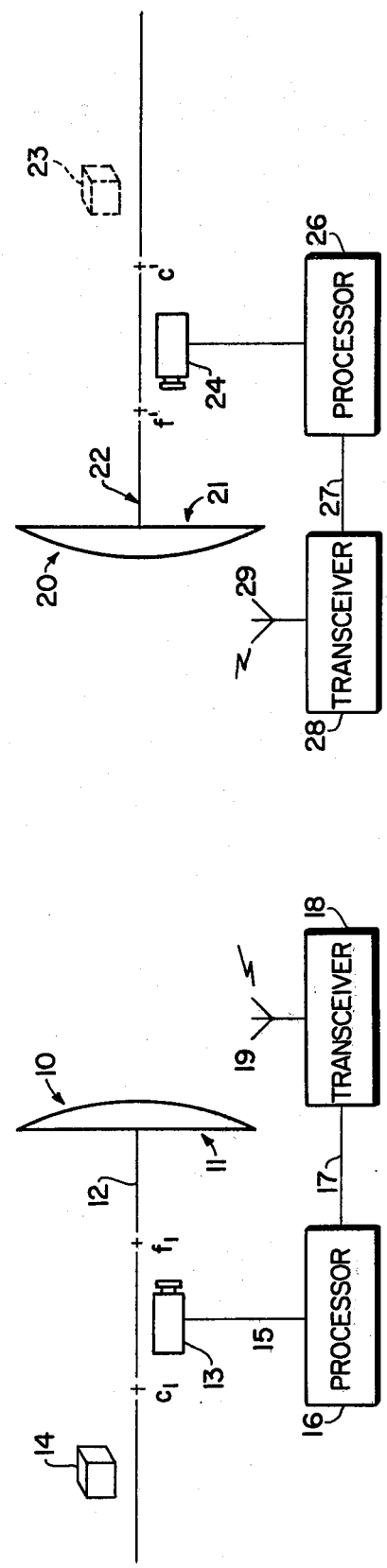

FIG. 1 discloses the entire illusion transmission system including both the transmission station and the remote station.

Figure 2:
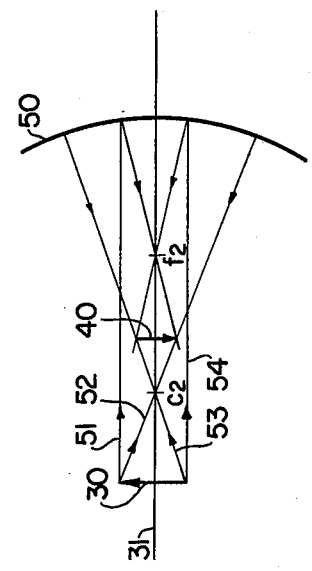

FIG. 2 discloses light ray patterns of an object and image of a concave mirror.

Figure 3:
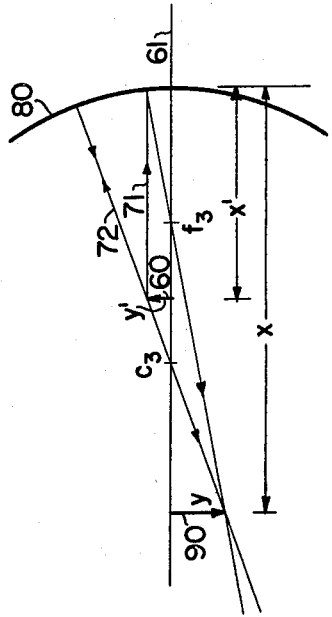

FIG. 3 also shows light ray patterns of object and images at a concave mirror.

DETAILED DESCRIPTION OF THE INVENTION

The principles of the invention may be best understood upon a brief review of optical principles relative to concave mirrors. Referring to FIG. 2, there is shown object 30 disposed about principle axis 30 beyond the center of curvature C2 of spherical mirror 50. Light rays, 51, 52, 53, and 54 generated by object 30 are reflected from the surface of concave mirror 50 to produce image 40. It should be noted that all rays of light emanating from object 30 which is paralled to principle axis 31 will reflect from the surface of mirror 50 and converge at the focal point F2. Since the angle of incident equals the angle of reflection for the rays of light emanating from object 30, all rays of light emanating from any particular point of object 30 will converge at the corresponding point of image 40.

For concave mirrors of spherical shape, a small angle of incident and reflection will insure minimal distortion of the image. It is well known in the art that a concave mirror of parabolic shape will insure non distortion of the image for even larger angles of incident, and accordingly, applicant suggests this type be employed to provide the best mode of the invention.

FIG. 3 is illustrated to disclose the principle that the image and object may be interchanged. Object 60 is disposed about principle axis 61 between focal point F3 and center of curvature C3. Light rays 71 and 72 emanating from object 60 are reflected from the surface of mirror 80 thereby creating image 90 which is real and inverted.

It is the intent of applicant in her illustration of the ray diagram of FIGS. 2 and 3 that the object and image position may be interchanged. It should also be noted that the respective size of the image and object may also be variable in accordance with the distance of the object from the surface of the mirrors, while noting that either the object or image must remain within the boundaries of the focal point and the center of curvature. Referring to FIG. 3, that relationship between the respective sizes of the image and objects may be expressed in terms of X prime/X = Y prime/Y. Consequently, the greater the distance image or object 90 is disposed from the surface of the concave mirror, the smaller in size will be image or object 60, assuming the interchangeability of the image and the object positions.

Now referring to FIG. 1, the gist of the entire invention is disclosed wherein the transmission station consists of a parabolic mirror 10 having reflector surface 11, principle axis 12, focal point F1, and center of curvature C1. Disposed about the principle axis beyond the focal point is object 14 which is normally illuminated by conventional light sources. Image detection means 13 is shown disposed about the principle axis between focal point F1 and center of curvature C1. The detection means may be conventional television camera having its lens arranged to focus reflected images from the surface of parabolic mirror 10. When viewed with FIG. 3, object 14 will produce an image at the lens of camera 13. That image is processed by processor 16, as are conventional television signals, and are then transmitted by cable or electromagnetic means. Such means are well known in the art.

After the signals from image projector 13 are processed by processor 16, the signals are then transmitted to a remote site wherein receiver 28 accepts the signals for processing by processor 26 for instantaneous projection of an image 23. Projector 24 projects an image onto surface 21 of mirror 20 to produce an illusional object beyond the focal point F. In the preferred embodiment of the invention, projector 24 is disposed between the focal point and the center of curvature of mirror 20. It is important to note that projector 24 must project the image about the principle axis 22 of mirror 20 in order that the illusionary object appear in its proper perspective. Additionally, it should be noted that projector 24 may be positioned at a point beyond the focal point to produce the respective illusionary object of a particular size. As projector 24 is displaced further away from mirror 20, illusionary object 23 becomes smaller.

Image 23 may be viewed by an observer as a reflected object when the observer is positioned in the image field. At the transmission end of the system, the lens of the television camera may be omitted and the reflected image focused directly upon the photo-sensitive element of the camera. A camera which employs an image orthicon may be utilized with the principles of this invention. The image so generated is then transmitted to the receiver, and projected onto the surface of the mirror. There is no projection screen utilized as the illusional image is observed directly as a reflection from the surface of the mirror. The lens of projector 24 is adapted to provide a focused image at a location along the axis of mirror 20 produce the illusional image beyond F as shown in FIG. 1.

Other types of cameras or image detention devices may be employed to achieve the same or similar objectives. For instance, an array of optical fibres may also be employed to detect the reflected image from mirror 10 in a quantitized manner, the array of fibres then producing an image which may be processed for further transmission by conventional means to a receiver, which also includes a similar array of optical fibres for reconstruction of the image as detected.

Further and additional modifications to the invention may be made by a person skilled in the art to which this subject matter pertains, and accordingly, it is not the intent of the inventor to limit her invention to exactly what is claimed, shown, or described herein. On the contrary, it is the inventors purpose to include all such modifications, arrangements, or adaptations which may be so made.

Now, there being a brief description of the invention set forth, the following is claimed:

1. A three dimensional illusional television system for transmitting an illusion of an object comprising:
   an image transmitter, said image transmitter including a first concave mirror having a focal point and center of curvature for producing real images of an object, an object field disposed about the principle axis of the concave mirror beyond the center of curvature of the concave mirror, an image field disposed about the principle axis and between the center of curvature and focal point of the concave mirror, and image detection means for generating electronic signals from said reflected real images;
   a facsimile transmitter for receiving said electronic signals from the image detection means and transmitting said received signals to an image receiver, and;
   an image receiver, said image receiver including a second concave mirror having a principle axis, focal point, and center of curvature; a second object field disposed about the principle axis and between the focal point and the center of curvature of said second mirror; and a video image projector disposed in the object field for projecting light rays onto the concave mirror, said projector including means for receiving electronic signals from said facsimile transmitter and producing an image therefrom whereby an illusional image may be viewed beyond the focal point.

* * * * *